(12) United States Patent
Takezaki et al.

(10) Patent No.: US 10,122,223 B2
(45) Date of Patent: Nov. 6, 2018

(54) AXIAL GAP MOTOR

(71) Applicants: Dynax Corporation, Chitose-shi Hokkaido (JP); National University Corporation Hokkaido University, Sapporo-shi, Hokkaido (JP)

(72) Inventors: Kenichi Takezaki, Chitose (JP); Wataru Hino, Chitose (JP); Koji Harada, Chitose (JP); Masatsugu Takemoto, Sapporo (JP); Satoshi Ogasawara, Sapporo (JP)

(73) Assignees: Dynax Corporation, Chitose-shi, Hokkaido (JP); National University Corporation Hokkaido University, Sapporo-shi, Hokkaido (JP)

( * ) Notice: Subject to any disclaimer, the term of this patent is extended or adjusted under 35 U.S.C. 154(b) by 170 days.

(21) Appl. No.: 15/102,571

(22) PCT Filed: Oct. 3, 2014

(86) PCT No.: PCT/JP2014/076513
§ 371 (c)(1),
(2) Date: Jun. 8, 2016

(87) PCT Pub. No.: WO2015/087604
PCT Pub. Date: Jun. 18, 2015

(65) Prior Publication Data
US 2016/0322869 A1 Nov. 3, 2016

(30) Foreign Application Priority Data
Dec. 11, 2013 (JP) ................. 2013/256013

(51) Int. Cl.
*H02K 1/02* (2006.01)
*H02K 1/27* (2006.01)
(Continued)

(52) U.S. Cl.
CPC ............... *H02K 1/02* (2013.01); *H02K 1/27* (2013.01); *H02K 1/2793* (2013.01); *H02K 21/24* (2013.01); *H02K 16/04* (2013.01); *H02K 2213/03* (2013.01)

(58) Field of Classification Search
CPC ........ H02K 1/02; H02K 1/2793; H02K 21/24; H02K 2213/03
(Continued)

(56) References Cited

U.S. PATENT DOCUMENTS

2005/0040721 A1 * 2/2005 Kusase ................ H02K 1/278
310/156.43
2007/0024147 A1 * 2/2007 Hirzel ................ H01F 1/14775
310/191
(Continued)

FOREIGN PATENT DOCUMENTS

JP 2007043864 A 2/2007
JP 2009207293 A 9/2009
(Continued)

*Primary Examiner* — John K Kim
(74) *Attorney, Agent, or Firm* — Howson & Howson LLP

(57) ABSTRACT

To reduce eddy current loss in a supporting member of a rotor of an axial gap motor, and improve efficiency, the motor includes a rotor, and stators arranged opposite to the rotor. The rotor has a disc-shaped supporting member, having a plurality of mounting holes in each of which a permanent magnet segment is installed. In the stators, a plurality of field windings is arranged for generating a rotating magnetic field. The axial gap motor is provided with notches extending radially between each of the mounting holes of the supporting member in which a permanent magnet segment is fitted, and an outer peripheral edge of the supporting member.

2 Claims, 5 Drawing Sheets

(51) Int. Cl.
  *H02K 21/24* (2006.01)
  *H02K 16/04* (2006.01)

(58) Field of Classification Search
  USPC .................. 310/156.28, 156.29, 156.32, 268
  IPC ................................................ H02K 1/02,1/27
  See application file for complete search history.

(56) References Cited

U.S. PATENT DOCUMENTS

| | | | | |
|---|---|---|---|---|
| 2010/0171383 A1* | 7/2010 | Petrov | ...................... | H02K 1/02 |
| | | | | 310/156.28 |
| 2011/0241460 A1 | 10/2011 | Mabarki et al. | | |
| 2011/0273034 A1* | 11/2011 | Yamamoto | ........... | H02K 1/2793 |
| | | | | 310/44 |
| 2016/0322869 A1* | 11/2016 | Takezaki | ................ | H02K 21/24 |

FOREIGN PATENT DOCUMENTS

| | | | |
|---|---|---|---|
| JP | 2011055577 A | 3/2011 | |
| WO | 2008/003990 A2 | 1/2008 | |

\* cited by examiner

| | Rotational Speed [rpm] | Torque [Nm] | Output [kW] | Input Power [VA] | Apparent Power [kVA] | Power Factor | Current Density [Arms/m2] | Phase Angle [deg] | Effective Value [Arms] | Amplitude [A] | Iron Loss [W] | Copper Loss [W] | Eddy Current Loss [W] | Efficiency [%] | Efficiency (double) [%] | U-phase Phase Voltage Amplitude [V] | Torque Ripple [%] |
|---|---|---|---|---|---|---|---|---|---|---|---|---|---|---|---|---|---|
| Comparative Example | 1600 | 61.83 | 10.36 | 11.79 | 17.03 | 0.692 | 11.90 | 0.00 | 74.77 | 105.74 | 168.54 | 1095.19 | 169.98 | 87.84 | 85.39 | 107.4 | 2.29 |
| Working Example | 1600 | 62.14 | 10.41 | 11.69 | 16.72 | 0.699 | 11.90 | 0.00 | 74.77 | 105.74 | 168.87 | 1095.19 | 9.90 | 89.10 | 87.76 | 105.43 | 1.64 |
| Comparative Example | 2800 | 17.82 | 5.23 | 5.52 | 5.38 | 1.025 | 3.84 | 27.89 | 24.13 | 34.12 | 130.16 | 114.04 | 47.75 | 94.71 | 91.75 | 105.19 | 2.56 |
| Working Example | 2800 | 17.84 | 5.23 | 5.48 | 5.37 | 1.021 | 3.84 | 27.89 | 24.13 | 34.12 | 129.74 | 114.04 | 6.06 | 95.44 | 93.13 | 104.88 | 2.24 |
| Comparative Example | 5000 | 19.52 | 10.22 | 11.78 | 12.83 | 0.918 | 9.22 | 65.61 | 57.93 | 81.93 | 127.86 | 657.44 | 778.96 | 86.73 | 80.53 | 104.42 | 6.19 |
| Working Example | 5000 | 20.04 | 10.49 | 11.35 | 11.92 | 0.952 | 9.22 | 65.61 | 57.93 | 81.93 | 133.31 | 657.44 | 62.52 | 92.48 | 90.91 | 96.98 | 3.84 |

FIG. 4

AXIAL GAP MOTOR

FIELD OF THE INVENTION

The present invention relates to an electric motor, more specifically, to an axial gap motor having a small axial dimension and installable inside a wheel of a vehicle.

BACKGROUND OF THE INVENTION

A hybrid vehicle and an electric vehicle (EV) are gathering attention due to a steep rise in the prices of fossil fuels. In particular, an EV with an in-wheel type axial gap motor built inside the wheel requires no intricate and heavy-weight transmission, contributing effective utilization of space, cost reduction, and weight reduction. As a vehicle that can use such in-wheel type axial gap motor, a 1-seater or 2-seater compact car intended for short-distance travel, also referred to as city commuter, has been gathering attention. Since high performance is required in the in-wheel type driving motor used in the EV vehicle, including the city commuter, rare-earth magnets using expensive rare-earth elements have been used so far.

However, prices of rare earth elements have witnessed steep rise in recent times, and it has become difficult to procure the rare earth elements. Therefore, an in-wheel motor for EV that uses a ferrite magnet, which is cheaper and easily available, is being considered for use instead of the rare-earth magnet. Since the residual magnetic flux density of ferrite magnet is approximately 30% lower as compared to the rare-earth magnet, decrease in torque is at issue. In order to solve this issue; (1) an axial gap motor type structure was employed with an expectation for increase in torque and thinning in the axial direction, (2) permanent magnets (SPM) were mounted inside a rotor of this structure for maximizing torque and reducing iron loss inside a stator core; (3) further, a prototype of 5 kW size motor structure with a reduction gear installed inside a stator was manufactured in order to effectively utilize space inside the motor, and acute experimentation and research were repeated on the operating characteristics thereof. When a prototype of 10 kW size motor (16 poles and 18 slots) was manufactured for further increasing output, and operating characteristics thereof were measured, a problem of increase in eddy current loss inside the rotor was ascertained, while this problem was not apparent in the 5 kW size motor structure.

Therefore, the present invention has been made in order to solve the above-described problem, and the object of the present invention is to provide an electric motor, especially an axial gap motor, with little eddy current loss.

SUMMARY OF THE INVENTION

The above-described problems are solved by an axial gap motor that has a disk-shaped supporting member and a plurality of permanent magnet segments installed on the supporting member in such a state that the plurality of permanent magnet segments is spaced in a circumferential direction at a predetermined equal pitch angle between a hub section and an outer peripheral section of the disk-shaped supporting member. The axial gap motor includes a rotor fixed to an output shaft so as to be rotatable together with the output shaft, and a stator arranged, on at least one side of the rotor, opposite to the rotor, with a predetermined gap from the rotor. A plurality of field windings for generating a rotating magnetic field is arranged on the stator at a uniform pitch angle in the circumferential direction. A radially extending notch is provided between each mounting hole of the supporting member in which one of the plurality of permanent magnet segments is fitted, and an outer peripheral edge of the supporting member.

Each of the radially extending notches may be a dent in least one side of the supporting member such that the supporting member becomes thinner at the location of the notch. The notch is formed so that it has a width dimension, transverse to its radial direction, that is gradually narrowed, proceeding in a radially outward direction.

In other embodiments, each of the notches may be a hole penetrating through the supporting member both in the axial direction and in the radial directions of the supporting member.

A rim member composed of high-strength insulating material may be wound on an outer peripheral section of the supporting member.

The high-strength insulating material may be plastic reinforced with glass fiber, carbon fiber or high-strength polymer fiber.

Each of the notches may be filled with non-conductive material.

The non-conductive material may be thermoplastic resin selected from a group including phenol resin, epoxy resin and melamine resin.

According to the present invention, eddy current loss that occurs at the supporting member of the rotor arranged between the stators can be reduced, and electrical efficiency of the axial gap motor can be increased.

BRIEF DESCRIPTION OF THE DRAWINGS

FIG. 4 is a table showing experimental results indicating difference in performance between a working example of an axial gap motor in accordance with the present invention and a conventional axial gap motor (comparative example) without a notch provided on a supporting member;

DETAILED DESCRIPTION

Figure 1:
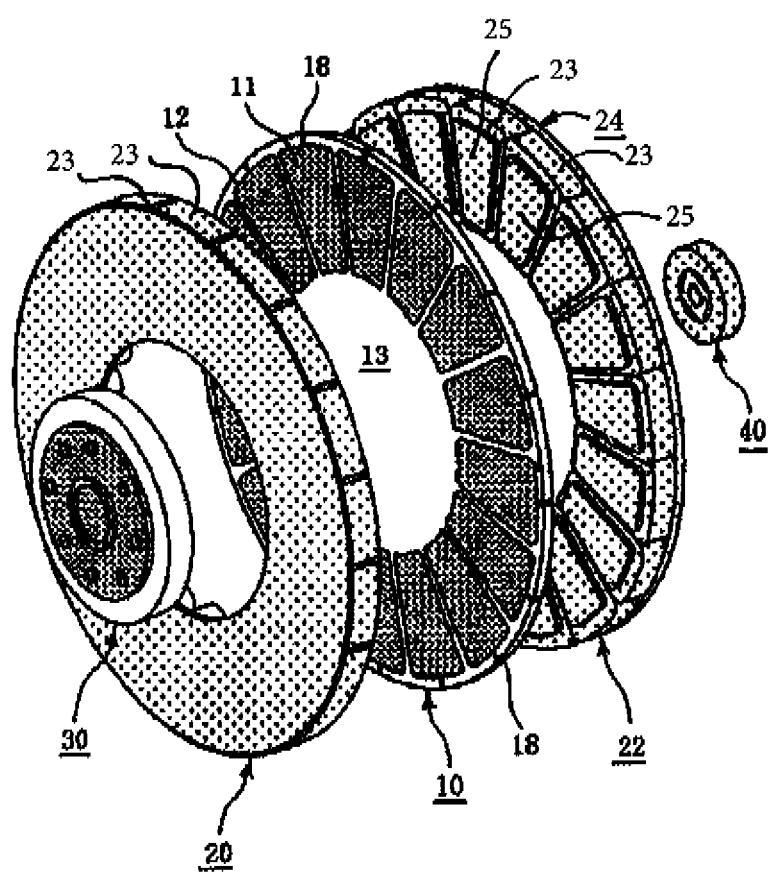
FIG. 1 is an exploded perspective view schematically illustrating an embodiment of an axial gap motor of the present invention.

Hereinafter, an embodiment of the present invention will be described in detail with reference to the appending drawings. Still, this embodiment is merely intended to describe the invention, and thus the present invention is not limited to this embodiment First, FIG. 1 will be referred to. An axial gap motor in accordance with the present invention is illustrated herein. This axial gap motor is mainly composed of a rotor 10 so as to rotate together with an output shaft (not shown in the figure) and stators 20 and 22 arranged, on both sides of the rotor 10, opposite to the rotor 10 with a predetermined gap. Field windings 23 are provided on each of the stators and parts of the field windings are disposed in radial slots, e.g., slot 24 in stator 22. These slots are formed between supports 25 on the stators, and are circumferentially spaced from one another at a uniform pitch angle.

In FIG. 1, a speed reducer 30 connected to an output shaft (not shown in the figure) is arranged in an inner space inside the stator 20, and a resolver 40 is arranged in an inner space inside the other stator 22 so as to detect a rotational position of the rotor 10. The stators 20 and 22 are installed on a housing (not shown in the figure) of this axial gap motor via suitable means. Such arrangement allows an axial dimension to be smaller, and makes it much easier to install the axial gap motor as an in-wheel motor inside a wheel for an EV.

Figure 2:
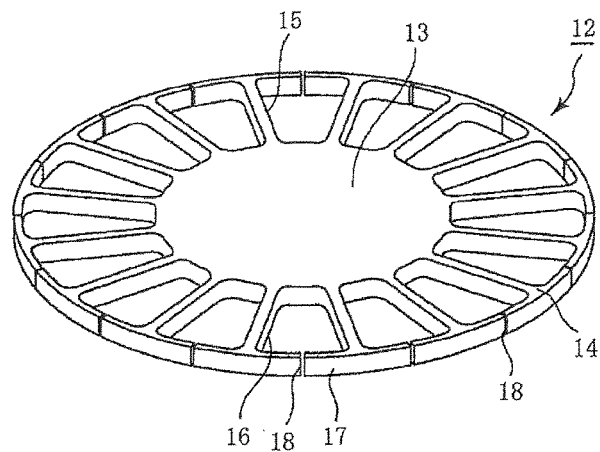
FIG. 2 is a perspective view schematically illustrating a supporting member provided with a plurality of mounting holes for mounting a plurality of permanent magnet segments.

Next, FIG. 2 will be referred to. As given below, the rotor 10 of the axial gap motor shown in FIG. 2 differs from a rotor of a conventional axial gap motor. The rotor 10 includes a disk-shaped supporting member 12 fixed to rotate together with an output shaft (not shown in the figure), and this supporting member 12 is composed of a central hub section 13 and an outer peripheral section 14 on which a plurality of magnet segments 11 is installed. In other words, the supporting member 12 is a coreless rotor in shape and composed of by a non-magnetic material such as stainless steel.

As shown clearly in FIG. 1, the plurality of permanent magnet segments 11 are spaced on the outer peripheral section 14 of the supporting member 12 of the rotor 10 at an equal rotational angle in the circumferential direction. These permanent magnet segments 11 are composed of ferrite magnet not containing expensive rare-earth elements. These magnet segments 11 are fitted and fixed in mounting holes 16 formed, on the supporting member 12, in the same shape of the magnet segments 11. As fixing methods, shrink fitting, an adhesion method using an adhesive, and electrical spot welding can be used.

A predetermined skew angle (angle of a side surface of the magnet segment 11 with respect to a radial axis extending from a central axis) is formed on the side surface of the magnet segment 11 in order to reduce torque ripple and togging torque, and a planar shape of the magnet segment 11 is substantially trapezoidal. Spoke-shaped parts 15 are formed between these magnet segments 11, and these spoke-shaped parts 15 extend radially from the hub section 13 to an outer peripheral edge 17 of the supporting member 12.

Figure 3:
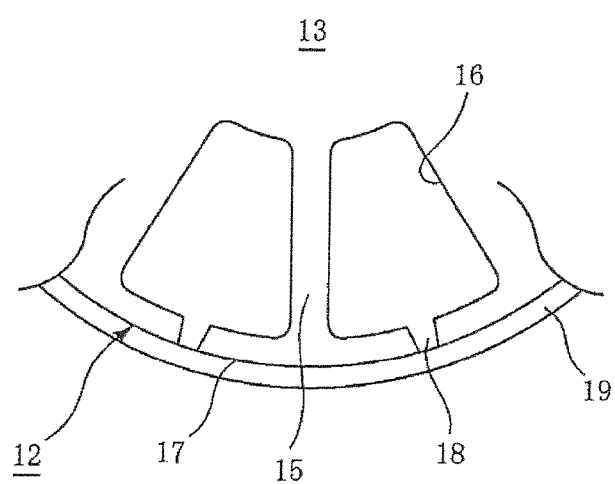
FIG. 3 is a partially enlarged view of a supporting member illustrating an arrangement of notches provided on the supporting member.

As shown in FIGS. 1 to 3, a notch 18 extends radially from a center of an outer side of the mounting hole 16 for mounting the magnet segment toward an outer peripheral edge 17 of the supporting member 12. This notch part 18 may be either a hole completely penetrating through the supporting member 12 in a width direction, or a non-through hole formed by removing material to such an extent that eddy current is not generated in the supporting member 12. For this reason, the same number of the notches 18 as the magnet segments 11 is positioned at an equal interval on the outer peripheral edge 17 of the supporting member 12. In order to prevent deterioration in strength of the supporting member 12 due to the provision of these notches 18, and to prevent generation of turbulence in the vicinity of the supporting member 12, it is desirable to fill these notches 18 with non-conductive and heat-resistant resin such as phenol resin, epoxy resin and melamine resin so as to make a filling surface and a surface of the supporting member 12 flush with each other.

As shown in a magnified drawing in FIG. 3, the notch 18 may also be gradually narrowed in width from the mounting hole 16 to the outer peripheral edge 17 of the supporting member 11 in the radially outward direction. A rim member 19 composed of high-strength insulating material may also surround the outer peripheral edge 17 of the supporting member 11. This high-strength insulating material may be plastic reinforced with glass fiber or carbon fiber. Providing such rim member 19 can compensate for deterioration in strength of the supporting member 11. It has been found that the rim member 19 provided in this way enables the supporting member 11 to actually withstand high-speed rotation (10,000 rpm) burst test (two-fold safety factor).

Figure 6:
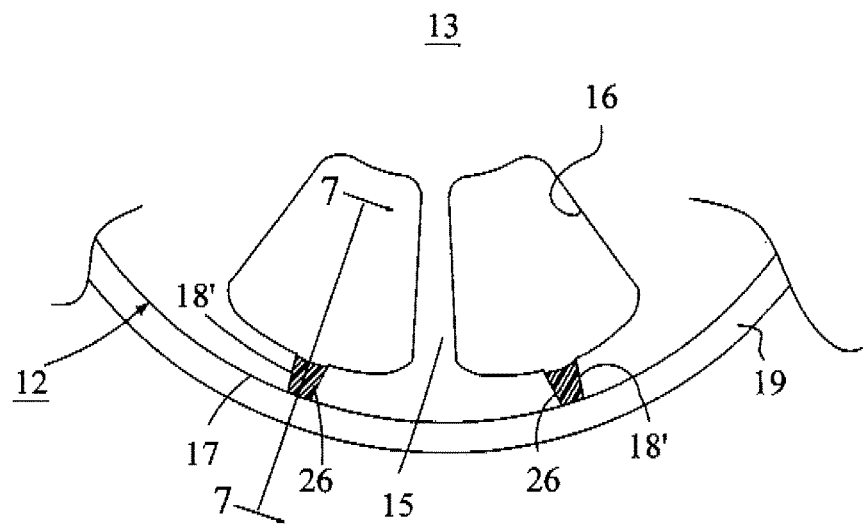
FIG. 6 is an enlarged view of a part of a notched supporting member, showing a non-conductive material filling the notches.

FIG. 6 shows a part of a rotor in which the notches 18' are filled with a non-conductive, heat-resistant resin 26. As in FIG. 3, the notches are gradually narrowed, proceeding in a radially outward direction. In the case of a rotor having resin-filled notches, the gradual narrowing of the notches prevents inertial thrusting out of the filling material when the supporting member 11, namely, the rotor 10, rotates at a high speed.

The rim member 19, can also prevent thrusting out of the filling material.

Figure 7:
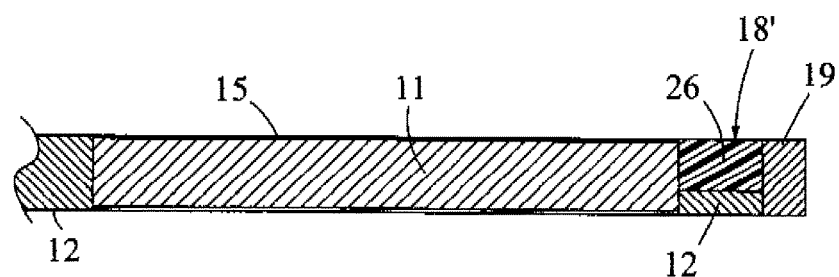
FIG. 7 is a sectional view taken on section plane 7-7 in FIG. 6.

As shown in FIG. 7, each radially extending notch 18' can be in the form of a dent in at least one side of the supporting member 12 such that the supporting member 12 becomes thinner at the location of each notch. A width dimension of each notch 18', in a direction transverse to the radial outward direction thereof, is gradually narrowed, proceeding in a radially outward direction.

FIG. 4 shows results of a characteristics comparison test carried out for the comparative example, which is the motor without the notch 18, and the working example, which is the axial gap motor (10 kW) with the notch 18. As understood from this table, the eddy current loss when the motor of the comparative example rotated at 1,600 rpm was 169.98 W, in contrast to an eddy current loss of 9.90 W when the motor of the working example, with the notches, rotated at the same 1,600 rpm. The eddy current loss when the motor of the comparative example rotated at 2,800 rpm was 47.75 W, in contrast to an eddy current loss of 6.06 W when the motor of the working example, with the notches, rotated at the same 2,800 rpm. Further, the eddy current loss when the motor of the comparative example rotated at 5,000 rpm was 778.96 W, in contrast to an eddy current loss of 62.52 W when the motor of the working example, with the notches, rotated at the same 5,000 rpm.

As described above, according to the present invention, by providing the notches 18 that extend from the mounting holes 16 toward the outer peripheral edge 17 of the supporting member 11 constituting the rotor 10, the eddy current that flows without the notches 18 is either cut off or reduced, and the eddy current loss that occurred in the motor is reduced.

Figure 5:
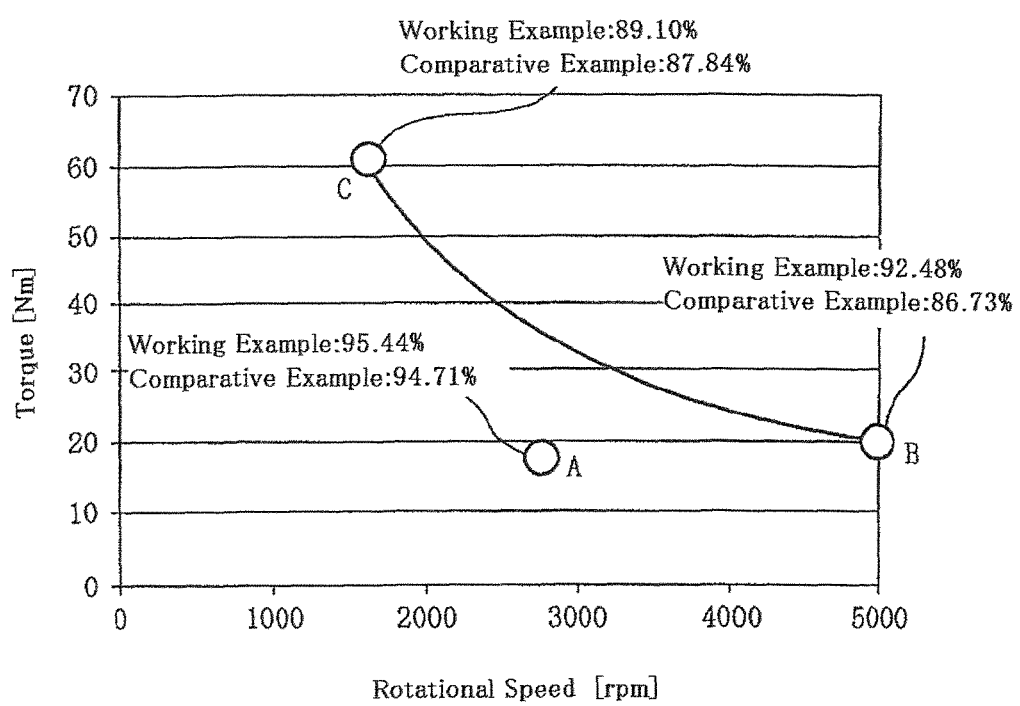
FIG. 5 is a graph showing respective efficiencies of a comparative example (without a notches) and a working example (with notches) under same conditions of rotational speed and torque.

Further, as shown in FIG. 5, at each of points A, B and C on the graph, respective efficiencies of the motor of the working example with the notches and the motor of the comparative example without the notches are measured under same conditions of rotational speed and torque. It can be observed from the graph that the efficiency of the motor of the working example with the notches is higher in all the cases.

Each of the stators 20 and 22 is arranged with a predetermined gap on both sides of the rotor 10, with the field windings 23 opposed to the magnet segments 11. Since the structure of the stator of the axial gap motor is well known to those skilled in the art, further description thereof is omitted.

10: Rotor
11: Magnet segment
12: Supporting member
13: hub section
14: Outer peripheral section
15: Spoke-shaped part
16: Mounting hole
17: Outer peripheral edge
18, 18': Notches (through holes)
19: Rim member
20 and 22: Stators

What is claimed is:

1. An axial gap motor having:
   a rotor comprising a disc-shaped supporting member;
   a plurality of permanent magnet segments, each being mounted in one of a plurality of mounting holes on said supporting member between a hub section and an outer peripheral section of said supporting member, the plurality of permanent magnet segments being spaced from one another circumferentially at a uniform pitch angle; and
   a stator arranged on at least one side of the rotor, opposite to the rotor, with a predetermined gap between the stator and the rotor;
   wherein a plurality of field windings for generating a rotating magnetic field is provided on the stator and parts of said field windings extend through radial slots formed in the stator, said slots being circumferentially spaced from one another at a uniform pitch angle;
   wherein a radially extending notch is provided between each said mounting hole of the supporting member in which one of said permanent magnet segments is fitted, and an outer peripheral edge of the supporting member;
   wherein each said radially extending notch is in the form of a dent in a least one side of the supporting member such that the supporting member becomes thinner at the location of each said notch, and wherein a width dimension of each said notch in a direction transverse to the radial outward direction thereof is gradually narrowed, proceeding in a radially outward direction; and
   wherein a rim member composed of a high-strength insulating material is provided on an outer peripheral section of the supporting member.

2. The axial gap motor according to claim 1, wherein said high-strength insulating material is plastic reinforced with glass fiber, carbon-fiber or high-strength polymer fiber.

* * * * *